United States Patent [19]

Schlapp et al.

[11] Patent Number: 4,919,475
[45] Date of Patent: Apr. 24, 1990

[54] SLIDING ROOF OR SLIDING LIFTING ROOF FOR MOTOR VEHICLES

[75] Inventors: Albert Schlapp, Dreieich; Norbert Kunz, Maintal, both of Fed. Rep. of Germany

[73] Assignee: Rockwell-Golde G.m.b.H., Fed. Rep. of Germany

[21] Appl. No.: 349,738

[22] Filed: May 10, 1989

[30] Foreign Application Priority Data

May 31, 1988 [DE] Fed. Rep. of Germany ....... 3818476

[51] Int. Cl.⁵ .............................................. B60J 7/02
[52] U.S. Cl. .................................... 296/213; 296/216; 296/221; 296/222
[58] Field of Search ........................ 296/213, 221, 222

[56] References Cited

U.S. PATENT DOCUMENTS

| 4,375,899 | 3/1983 | Kajiyama et al. | 296/213 |
| 4,592,586 | 6/1986 | Yagami et al. | 296/213 |
| 4,671,565 | 6/1987 | Grimm et al. | 296/213 |
| 4,844,532 | 7/1989 | Ono et al. | 296/213 |

Primary Examiner—Robert R. Song

[57] ABSTRACT

In a sliding roof or sliding lifting roof for motor vehicles, the lateral guide rails for the sliding guidance of the rigid cover and the roof frame carrying the same are entirely located below the fixed vehicle roof and are fitted closely adjacent thereto, so that neither the roof frame, nor the guide rails can reduce the free opening cross-section of the roof cutout releasing the cover following its opening. As the water channel for collecting the water penetrating via the marginal gap between the cover and the roof cutout edge is fixed only at a limited distance below guide rail, the overall height of the roof construction can be limited. As a result of the elastically deformable construction of the edge of the water channel facing the roof cutout, the guide parts of the cover or, in the case of the sliding lifting roof, the intermediate frame can pass in unimpeded manner through the elastically expandable gap between the roof cutout edge and the elastically deformable water channel edge to the guide rails.

18 Claims, 15 Drawing Sheets

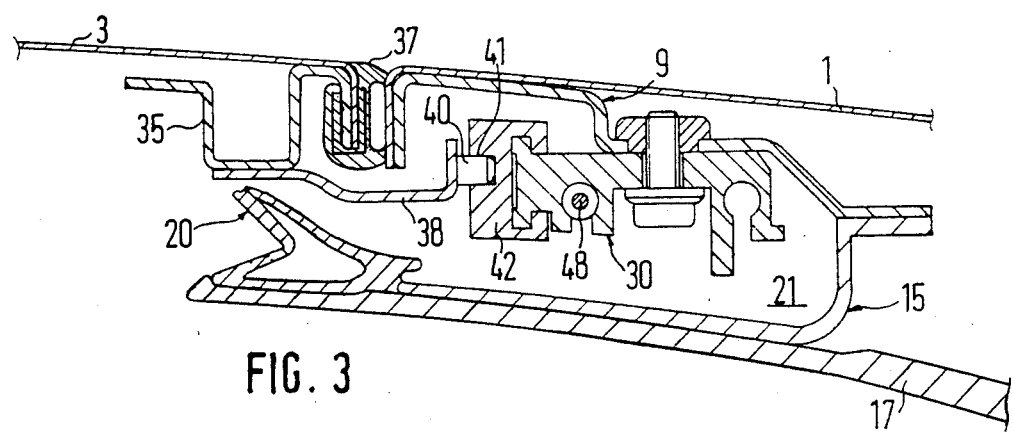
FIG. 3
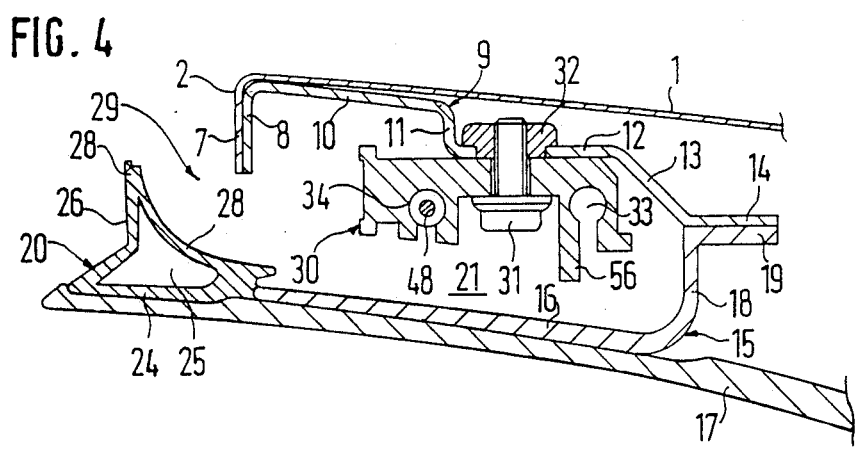
FIG. 4
FIG. 7
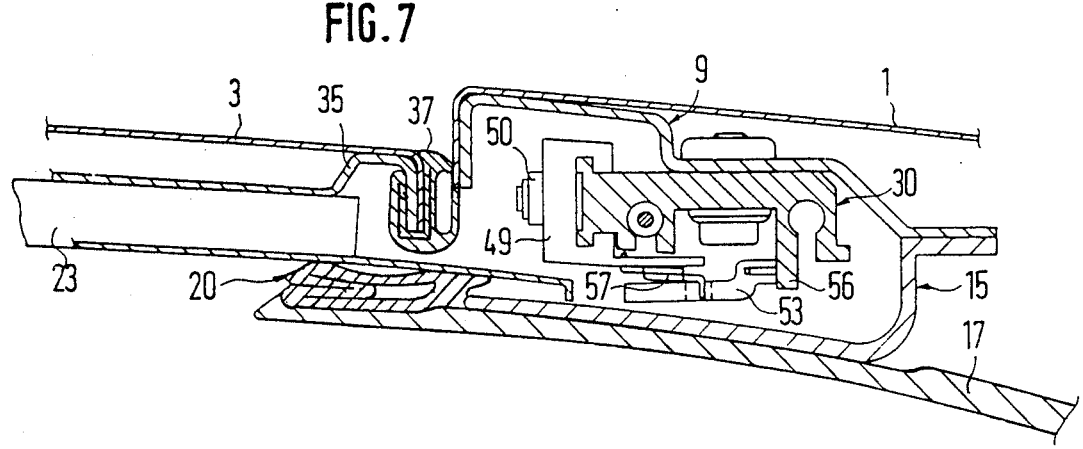

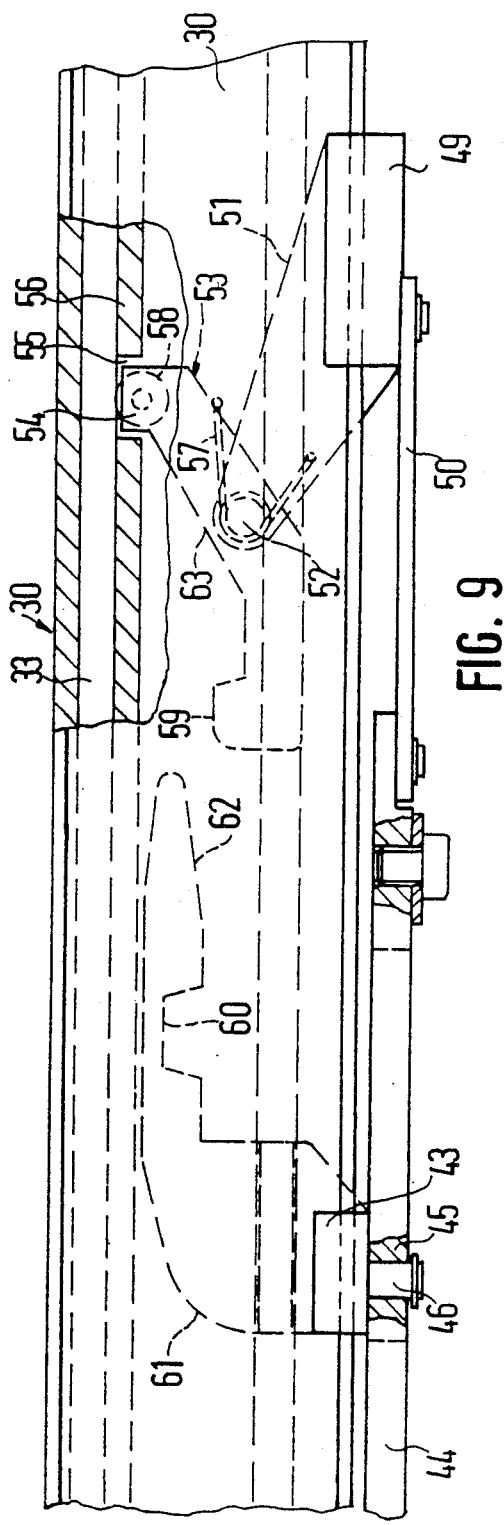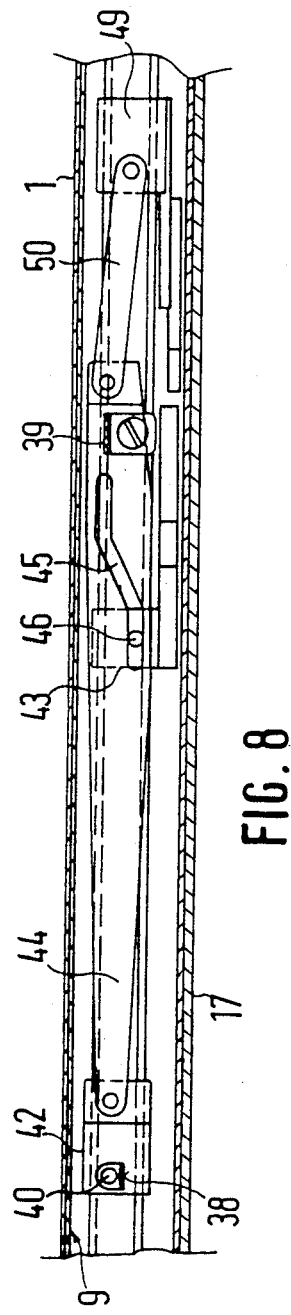

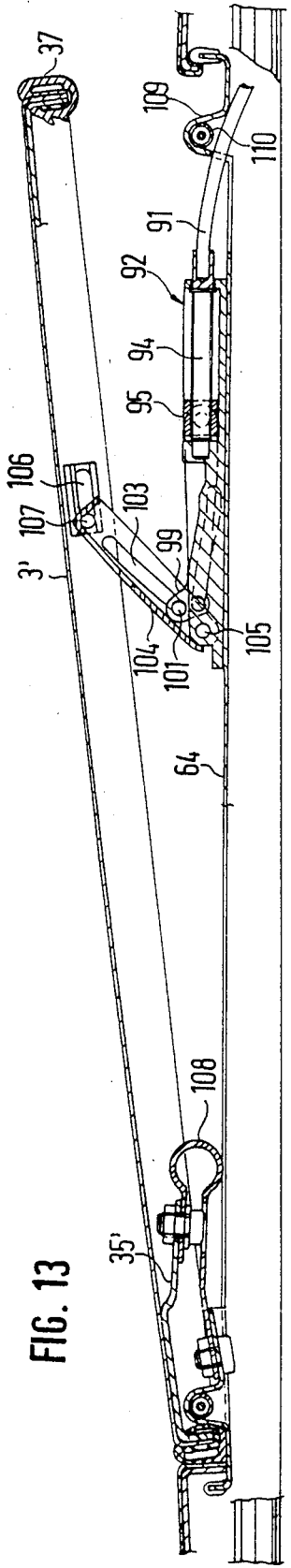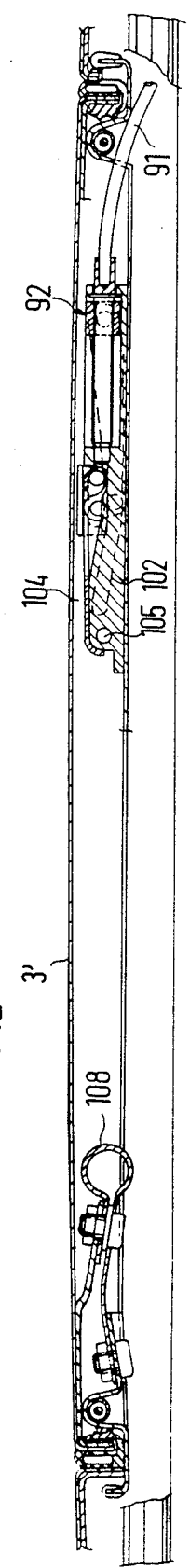

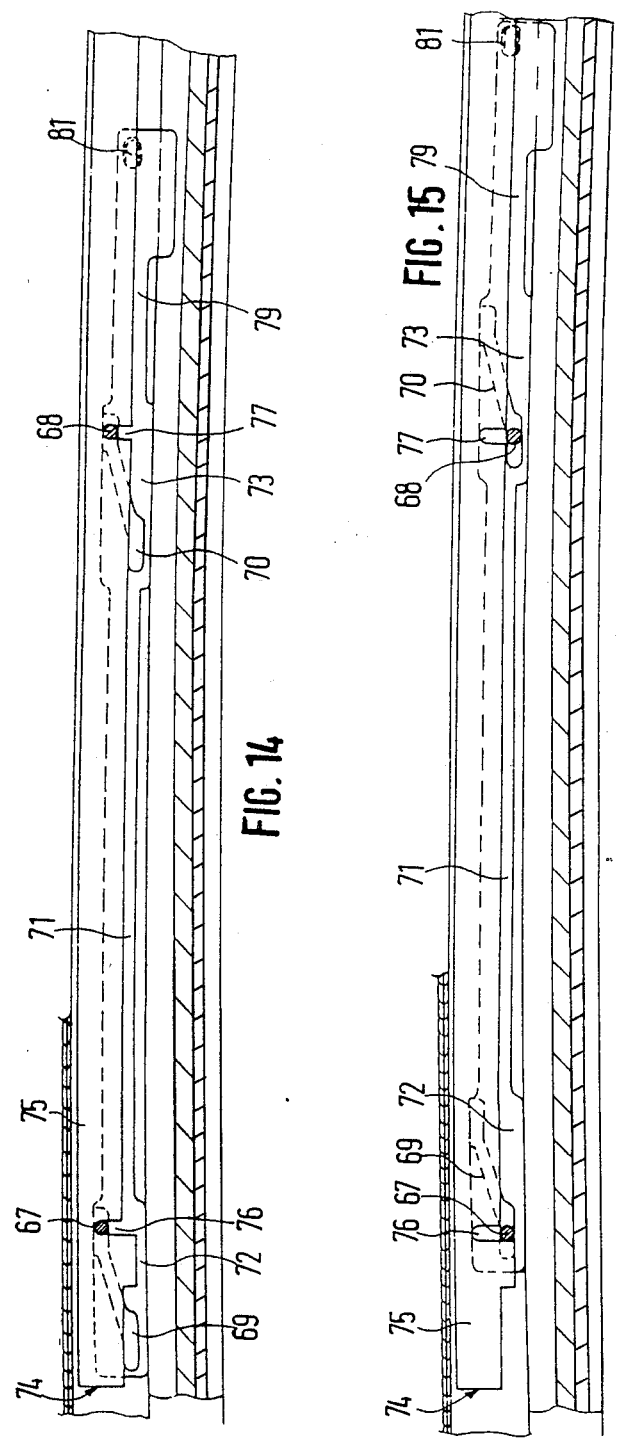

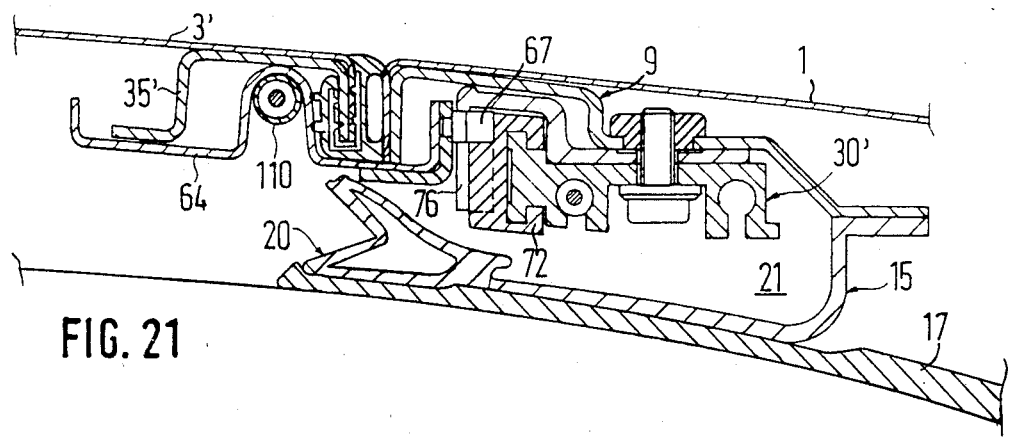
FIG. 21
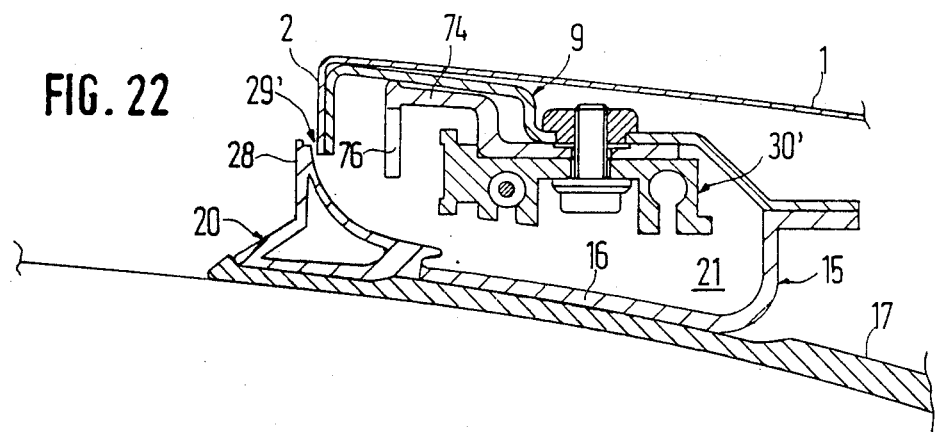
FIG. 22
FIG. 23
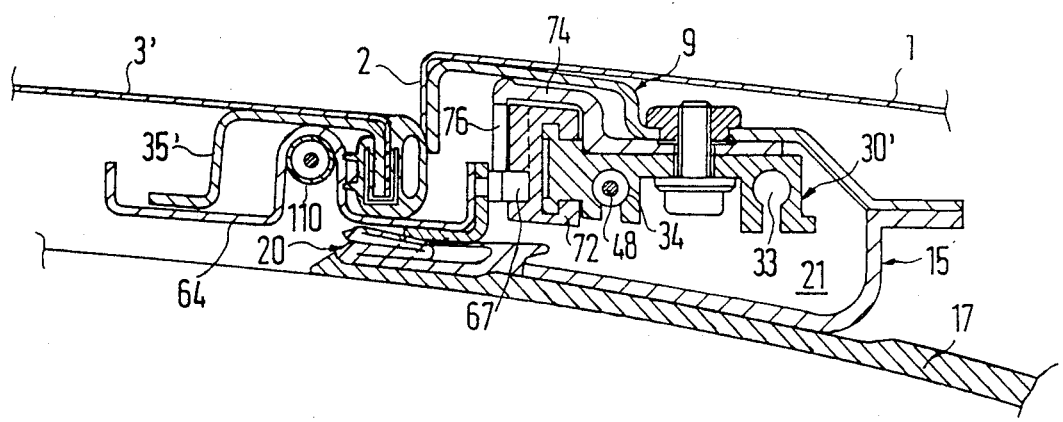

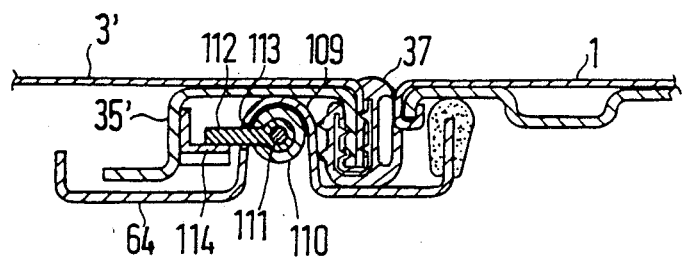
FIG. 24
FIG. 25
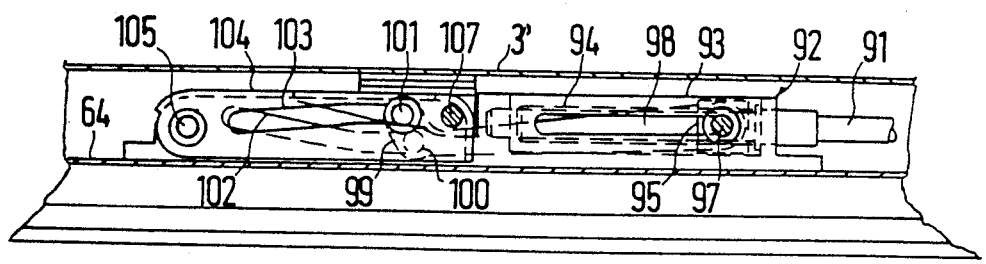

SLIDING ROOF OR SLIDING LIFTING ROOF FOR MOTOR VEHICLES

BACKGROUND OF THE INVENTION

The invention relates to a sliding roof or sliding lifting roof for motor vehicles.

In known sliding roofs and sliding lifting roofs, lateral guide rails are fitted to the top of a roof frame projecting into a roof cutout area and are therefore also located within the latter. As a result of this construction, the outer roof cutout is much larger and at least wider than the inner roof opening in the vehicle top, which also covers the roof frame parts projecting into the roof cutout. Thus, in the known roof constructions, the roof cutout size is not completely utilized for obtaining a maximum overall roof opening. In other words, the known roof constructions, for a given size of the inner roof opening in the vehicle top, require a much larger outer roof cutout in the fixed vehicle roof.

A further problem occurring with sliding roofs and particularly sliding lifting roofs is the relatively large overall height of the roof construction, which so restricts the head clearance in the vehicle interior, that it is difficult or impossible to equip modern, low vehicle bodies with a sliding or sliding lifting roof. Particularly sliding lifting roof constructions designed for high speeds and which to this end have an intermediate frame engaging below the roof cutout edges (e.g. German Patent No. 30 20 675) have an increased overall height due to the fitting of the intermediate frame.

SUMMARY OF THE INVENTION

An object of the present invention is to provide a sliding roof or sliding lifting roof, in which the inner roof opening in the vehicle top is not substantially smaller than the outer roof cutout, whilst simultaneously a reduction of the overall height of the roof construction is sought and whose cover must be able to effectively withstand the high lifting forces occurring at high speeds.

According to the present invention, there is provided a sliding roof or sliding lifting roof for a motor vehicle, with a rigid cover and also provided with an intermediate frame in the case of the sliding lifting roof, the rigid cover being displaceably guided on lateral guide rails, optionally together with the intermediate frame, which guide rails are fixed to a roof frame, which surrounds a roof cutout of the fixed vehicle roof, and the rigid cover being driven by a drive cable guided in the guide rails and engaging on guide parts connected thereto; the guide rails are arranged entirely below the fixed vehicle roof and are fixed to the roof frame, which is closely adjacent to the fixed vehicle roof and fitted thereto, being set back with respect to the roof cutout edge; a water channel is provided below the guide rails and at a limited distance therefrom, the water channel being elastically deformable from above at least on its edge adjacent to the roof cutout edge and the guide parts connecting the cover and optionally the intermediate frame to the guide rails passing through the elastically expandable gap between the roof cutout edge and the elastically deformable water channel edge.

As a result of the complete shifting of the guide rails and the roof frame carrying the same to below the fixed vehicle roof, neither the roof frame, nor the guide rails project in the roof cutout and cannot therefore reduce the size thereof. The overall height of the roof construction is also significantly reduced by fixing the guide rail to the roof frame in close proximity to the fixed vehicle roof and by the water channel positioned below and at a limited distance from the guide rail. The elastically deformable construction of at least the water channel edge adjacent to the roof cutout edge permits, despite the limited distance between the guide rail just below the fixed vehicle roof and the water channel, the passage of the guide parts of the roof construction connecting the cover or the intermediate frame to the guide rails through the elastically expandable gap between the roof cutout edge and the elastically deformable water channel edge. As the elastically deformable water channel edge only has to underpin the marginal gap between the cover and the roof cutout edge, in order to be able to receive the water passing through the marginal gap, the elastically deformable water channel edge only projects slightly into the roof cutout, so that essentially the entire roof cutout size can be utilized for the roof opening. The guide parts of the roof construction emanating from the cover or intermediate frame engage below the fixed roof surface, so that the cover or the intermediate frame with the cover is securely anchored in the roof cutout, so that the closed cover can withstand high lifting forces.

The roof frame can have a cross-sectionally horizontal mounting frame which permits the appropriate fitting of the guide rail from below. The guide rail construction according to claim 3 provides, compared with the hitherto known constructions, that to a certain extent the guide rail is inverted round the same without any performance losses occurring. The use of the lateral guide rail regions for guiding displaceable elements also helps to reduce the overall height.

A particularly flexible water channel edge is achieved through the features of claim 4. The elastic hollow chamber profile provided for this is appropriately constructed according to claim 5. Claim 6 relates to an advantageous construction of the water channel, with respect to which account can advantageously be taken of the fact that in the invention the water channel is no longer a component which stiffens the roof frame and does not have to absorb forces introduced into the guide rails by the cover or the intermediate frame. The water channel can also form part of the roof top. It can also be advantageous, despite a one-part construction, to give the water channel a differing material elasticity over its width. Claim 10 illustrates the limited influencing of the roof cutout size by the elastically deformable water channel edge.

As in the case of the sliding lifting roof, the intermediate frame underpins the marginal gap and receives water passing through it and passes it laterally to the water channel, the elastically deformable water channel edge need not project into the roof cutout and can instead be flush with the edge of the latter and may even be set back behind the same.

BRIEF DESCRIPTION OF THE DRAWINGS

For a better understanding of the invention and to show how the same may be carried into effect, reference will now be made, by way of example, to the accompanying drawings, in which:

FIG. 3 is a cross-section along line III—III in FIG. 2, FIG. 4 is a cross-section corresponding to FIG. 3, but without the cover, FIGS. 5 to 7 are further cross-sections along lines V—V to VII—VII, respectively, in FIG. 2, FIG. 8 is a longitudinal section along line VIII—VIII in FIG. 2, FIG. 9 is a larger scale detail of FIG. 2 in a broken away and partly broken open plan view, FIG. 12 is a longitudinal section through the closed cover along the line XII—XII in FIG. 11, FIG. 13 is a longitudinal section corresponding to FIG. 12, but without the raised cover, FIG. 14 is a longitudinal section through the fixed vehicle roof with the cover closed along line XIV—XIV in FIG. 11, FIG. 15 is a longitudinal section corresponding to FIG. 14, but with the cover lowered, FIG. 21 is a cross-section along line XXI—XXI in FIG. 11 with the cover closed, FIG. 22 is a cross-section corresponding to FIG. 21, but without a cover and intermediate frame, FIG. 23 is a cross-section corresponding to FIG. 21, but with the cover lowered and intermediate frame, FIG. 24 is a longitudinal section along line XXIV—XXIV in FIG. 10, FIG. 25 is a longitudinal section along line XXV—XXV in FIG. 16.

DESCRIPTION OF PREFERRED EMBODIMENTS

Figure 1:
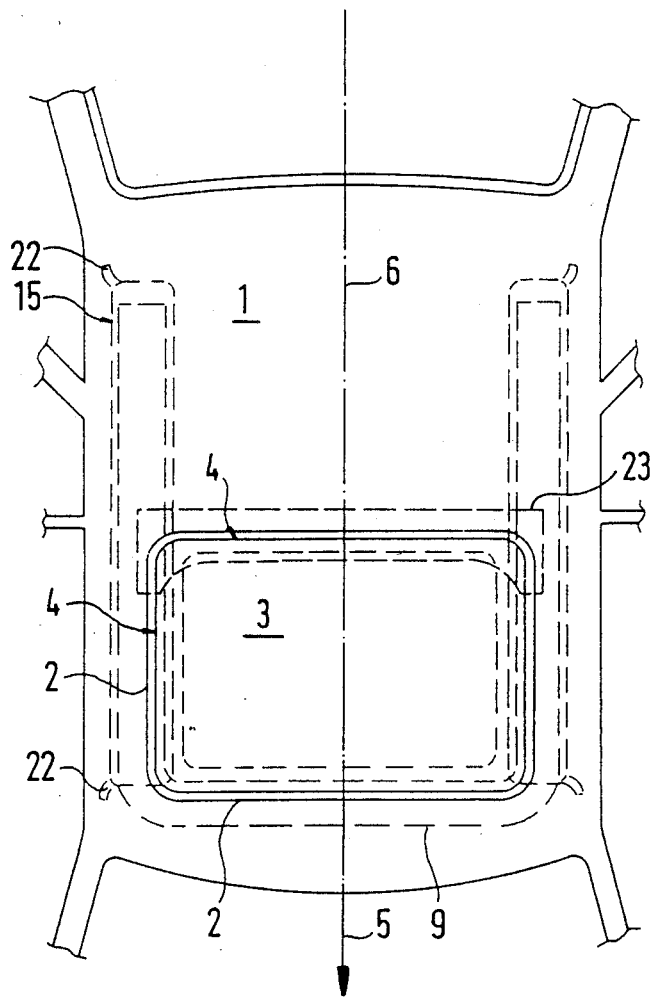
FIG. 1 is a broken away plan view of a vehicle roof equipped with a sliding roof.

FIGS. 1 to 9 illustrate the use of the invention in the case of a sliding roof. As can be gathered from FIG. 1, in a vehicle roof 1 is provided a rectangular roof cutout bounded by an all-round roof cutout edge 2 and which in the closed position of the roof is closed by a correspondingly shaped rigid cover 3, accompanied by the formation of an all-round marginal gap 4. The forward travel direction of the vehicle is indicated by arrow 5 in FIG. 1. With respect to the drawn-in, median longitudinal axis 6, the roof construction is symmetrical, so that reference is made hereinafter to the right-hand side roof elements shown in FIGS. 2 to 9, the left-hand side elements being homologously constructed.

Figure 2:
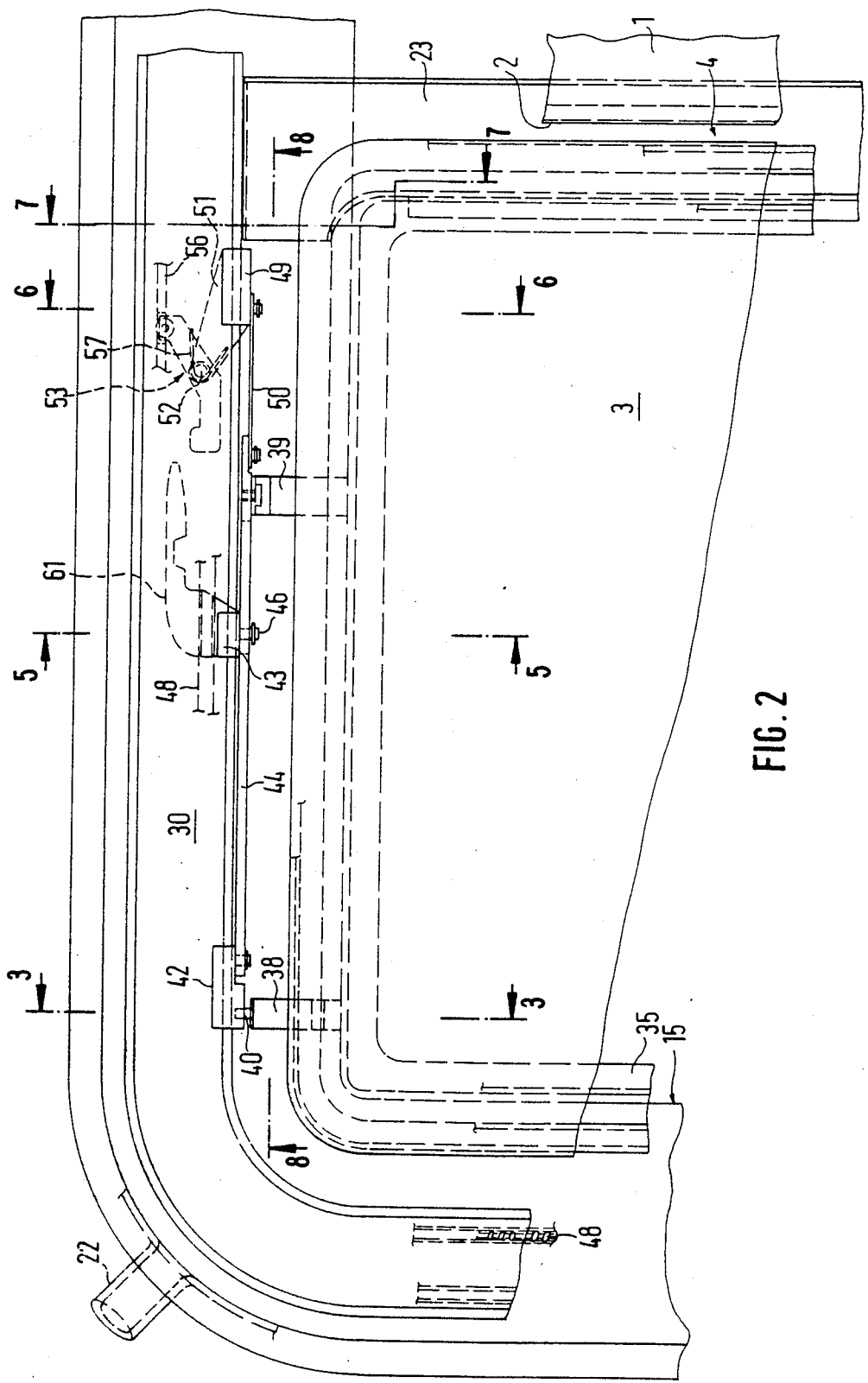
FIG. 2 is a broken away plan view of part of the sliding roof shown in FIG. 1.

As shown in the cross-sections of FIGS. 3 to 7, the roof cutout edge 2 is formed at the front and sides by a right-angled, vehicle-inwardly directed downward bend 7 of the vehicle roof 1, whilst at the rear and as indicated in FIG. 2, a 180° flanging forms the roof cutout edge. Corresponding downward bends 8 of a roof frame 9 are fixed to the downward bends 7, e.g. by spot welding. The roof frame 9 in the embodiment shown is in cross-section such that an area 10 roughly following the inclination of the vehicle roof 1 is directly connected to its downward bend 8. A downwardly directed portion 11 is provided following a downward bend, to which is connected a horizontally directed mounting plate 12 by means of a further downward bend. An outwardly and downwardly directed sloping bend 13 is connected to the mounting plate 12 and this terminates with a horizontally directed flange 14.

Below the roof frame 9 is provided an upwardly open, trough-shaped profile strip 15, whose lower wall part 16 rises from the outside to the roof cutout roughly following the slope of the roof and which serves as an engagement or contact surface for the roof top 17, which is constructed in the present embodiment as a moulded shell. On the outside, the wall part 16 passes into an upward bend 18, which terminates with a horizontally outwardly extending flange 19, which engages from below on the flange 14 of the roof frame 9 and can be connected thereto by bonding. An elastically deformable hollow chamber profile 20 is attached on the inside to the wall part 16 of the profile strip 15. Below the roof frame 9, the profile strip and the hollow profile 20 form a water channel 21 for collecting and draining away the washing and rain water penetrating via the marginal gap 4. The draining of the water from the water channel 21 takes place by means of a pipe connection 22 (FIGS. 1 and 2) connected to the profile strip 15. At the rear, the marginal gap 4 is underpinned by a water guide plate 23 fixed to the cover 3 and which terminates laterally above the water channel 21, as can be gathered from FIGS. 1, 2 and 7.

In its inoperative position, the hollow chamber profile 20 has the cross-sectional shape shown in FIG. 4, essentially comprising a base part 24 engaging on the roof top 17, a side wall 26 bending or projecting into a cavity 25 and facing the roof opening and a concavely shaped water channel wall 27. The side wall 26 and water channel wall 27 combine to form an upwardly directed ledge 28, which initiates the elastic deformation of the hollow profile 20. FIG. 3 shows the partial deformation of the hollow profile 20 when the cover 3 is closed, whilst FIG. 7 shows the complete deformation thereof, such as it undergoes in the case of a rear lowered cover in the vicinity of the water guide plate 23.

The roof cutout edge 2 and hollow profile 20 form an elastically expandable gap 29 (FIG. 4), through which project in the manner described hereinafter the guide parts of the cover. Apart from an initial deformation of the hollow profile 20, which is described hereinafter and also exists when the cover is closed, the gap 29 is only elastically expanded at the passage point, whereas in front of and below the same it is constricted as a result of the elastic recovery capacity of the hollow profile 20.

In the cross-sectional views, e.g. in FIG. 4, the hollow profile 20 is shown projecting relatively far into the roof cutout. However, it is sufficient if the hollow profile 20 only projects so far over the roof cutout edge 2, that it completely underpins the marginal gap 4, so as to deflect entering water into the water channel 21.

The profile strip 15 and hollow profile 20 can also be constructed in one piece from an elastic material. The profile strip 15 and hollow profile 20 can also be fixed to the roof top 17 constructed as a hard, moulded shell. In this case there is no need for the flanges 14, 19 and the sloping bend 15 of the roof frame 9, as shown in FIG.

26. It is then merely sufficient to have the upward bend 18 on the profile strip 15 for delimiting the water channel 21.

The mounting plate 12 of the roof frame 9 is used for fixing a guide rail 30, which is so fixed from below by screws 31 and nuts 32 to the mounting plate 12, that the two conventional, undercut cable ducts 33, 34 are open to the bottom. As a result of this fitting of the guide rail 30 on the roof frame 9 just below the roof 1, a limited overall height is obtained for the roof construction, in conjunction with the elastically deformable hollow profile 20 of water channel 21. The locating of the guide rail 30 below the vehicle roof 1 permits an almost complete utilization of the outer roof cutout bounded by the roof cutout edge 2, because the opening of the roof top 17 bounded by the hollow profile 20 is only slightly smaller than the roof cutout. The concealed position of the guide rail 30 requires the hereinafter described special measures for the guidance and driving of the cover 3.

Figure 6:
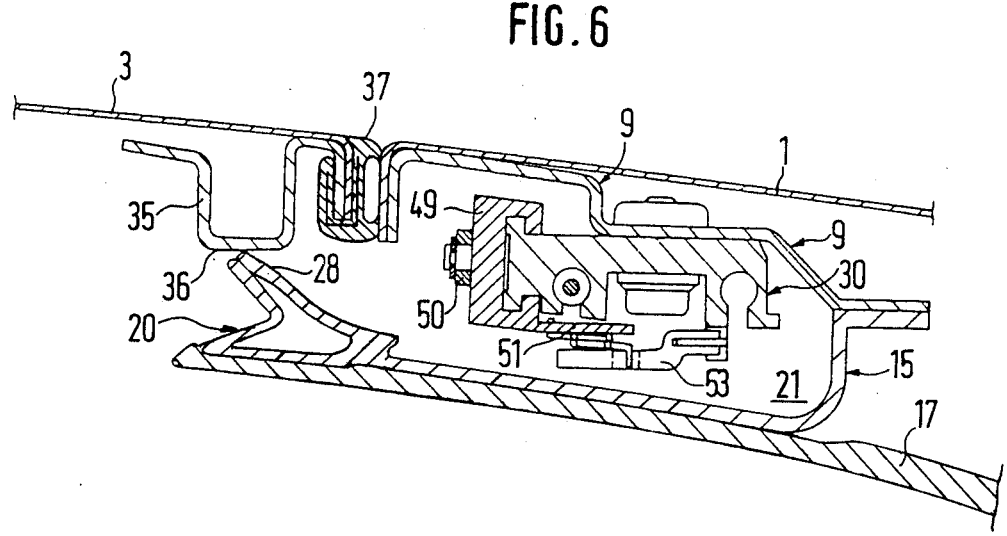
Figure 10:
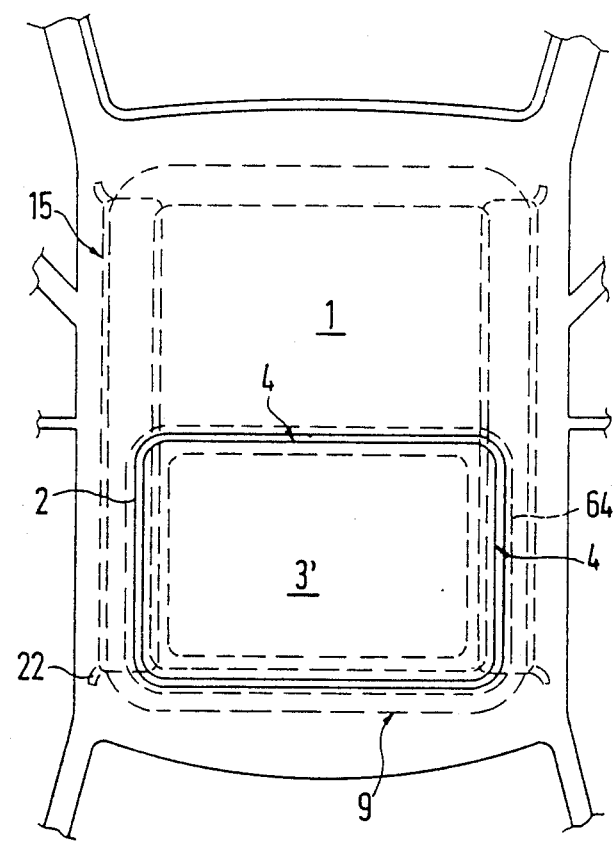
FIG. 10 is a plan view similar to FIG. 1 of a vehicle roof equipped with a sliding lifting roof.

A cover reinforcing frame 35 is fixed all round the bottom of the cover 3 and its lower surface 36 engages with the ledge 28 of the hollow profile 20, accompanied by the predeformation thereof, as can best be gathered from FIG. 6 showing the closed position of the cover 3. A marginal gap sealing profile 37 is fixed all round the outer edge of the cover and bridges the marginal gap 4. A front guide finger 38 and a rear guide finger 39, which pass through the elastically expandable gap 29 and extend to below the fixed vehicle roof 1, are fixed to the lower surface 36 of the cover reinforcing frame 35 to its covering side so as to project over its outer edge.

As can be gathered from FIGS. 2 and 3, the front guide finger 38 carries a horizontally directed swivel bearing pin 40, which engages in a corresponding bearing bore 41 in a front guide shoe 42 displaceably guided on the guide rail 30. The swivel bearing pin 40 and bearing bore 41 not only ensure the anchoring of the front cover region, but also form the swivel bearing for the cover 3, so as to enable same to permit the lowering of its trailing edge into the position shown in FIG. 7, if the cover is to be opened. Conversely the swivel bearing permits the raising of the trailing edge of the cover out of the position according to FIG. 7 into that according to FIG. 3, if, after closing, the cover is again completely in the roof cutout.

As illustrated in FIG. 3, the front guide shoe 42 is laterally guided on the guide rail 30. Correspondingly a rear guide shoe 43 is displaceably guided on the guide rail 30, as can be gathered from FIGS. 2 and 5. To the front guide shoe 42 is articulated the front end of a link 44 in whose link slot 45 (FIG. 8) engages a guide pin 46 fixed to the rear guide shoe 43. The link slot 45 has the standard shape for the raising and lowering of the trailing edge of the cover 3. FIG. 8 shows the relative position of these parts for the cover closed position. The rear guide finger 39 engages on the rear end of the link 44, so that the cover 3 is held by the link 44 in the position defined by the relative position of the link slot 45 and guide pin 46. The rear guide shoe 43 is fixed and in the embodiment shown (FIG. 5) is connected in one piece to a driver 47, which engages in the cable duct 34 and is fixed to a drive cable 48 displaceably guided in compressively rigid manner therein. Displacements of the drive cable, which can be brought about by a suitable hand or motor drive, lead to the control movements of the cover 3.

On the guide rail 30 is displaceably guided a third guide shoe 49, whose arrangement can be gathered from FIGS. 2 and 6 to 9. The guide shoe 49 is connected by means of a guide rod 50 to the rear end of the link 44 and has a projection 51 engaging below the guide rail 30. The projection 51 carries a roughly vertical bearing bolt 52 (FIGS. 2 and 9), on which is pivotably mounted a two-armed locking lever 53.

To secure the cover against undesired displacement thereof during the lowering and raising movement, in the cover closed position, the locking lever 53 engages with its end 54 in a recess 55, which is located in a vertically downwardly directed flange 56 (FIGS. 4 and 9) of the guide rail 30. A torsion spring 57 fixed to the bearing bolt 52 ensures that the end 54 is kept in engagement with the recess 55. If said engagement is removed in the manner to be described hereinafter, then a roller 58 fitted in rotary manner to the end 54 of the locking lever 53 rolls on the surface of the flange 56 which faces the same.

Figure 5:
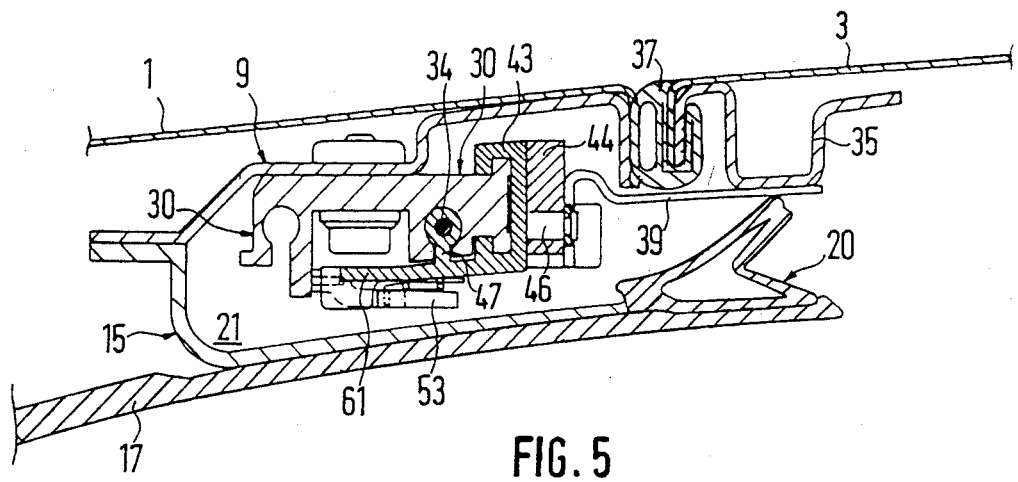

At the other end of the locking lever 53 is provided a coupling hook 59 with which is associated a corresponding coupling recess 60 in an unlocking and transportation member 61, which is fixed to the rear sliding shoe 43 and engages below the guide rail 30 (FIGS. 5 and 9). The unlocking and transporting member 61 has following onto the coupling recess 60, an unlocking finger 62, which co-operates with a sloping surface 63 on the locking lever 53, so as to draw the end 54 of the locking lever 53 out of the recess 55 for unlocking purposes at the end of the lowering movement of the cover 3, so that the cover is freed under the rear, fixed roof surface for sliding transport.

If in the case of the above-described sliding roof, the cover 3 is to be opened from its closed position shown in the drawings (except FIG. 7), then the drive cable 48 is moved to the right as viewed in FIG. 2. As illustrated by FIG. 8, the guide pin 46 in the link slot 45 consequently moves to the right, so that the link 44 and cover 3 are pivoted clockwise, accompanied by the lowering of the trailing edge of the cover. The unlocking and transport member 61 is also moved to the right with the rear guide shoe 43, so that the unlocking finger 62 meets the sloping surface 63 of the locking lever 53 and pivots same about its bearing bolt 52 in the clockwise direction in opposition to the tension of the torsion spring 57 until its end 54 is completely moved out of the recess 55. Simultaneously, the coupling hook 59 enters the coupling recess 60 of the unlocking and transport member 61. If the displacement of the drive cable 48 to the right is continued, then through the engagement of the coupling hook 59 and coupling recess 60, the third guide shoe 49 is moved to the right over the projection 51 and, via the guide rod 40, draws with it the link 44 and therefore also the front guide shoe 42. Together with the front guide shoe 42 and link 44, the cover 3 is drawn into an open position via the guide fingers 38, 39. The roller 58 rolls on the flange 56 of the guide rail 30. If the cover 3 is to be moved from its open into its closed position, then the drive cable 48 is again moved to the left with respect to FIG. 2. As a result of the engagement between the coupling hook 59 and coupling recess 60, the third guide shoe 49 is dragged over the projection 41 and, via the guide rod 50, advances the link 44 and all parts connected thereto. When the cover has reached its front end position, the end 54 of the locking lever 53 loaded by the torsion spring 57 drops into the recess 55, so that simultaneously the coupling hook 59 is moved out of the coupling recess 60. If the displacement of the drive cable 48 to the left is now continued, the engagement of the end 54 with the recess 55 secures the third guide shoe 49 and all parts connected thereto, so that the guide pin 46 of the rear guide shoe 43 is moved forwards in the link slot 45, so that as a result of the design of the latter the cover with its trailing edge, accompanied by the pivoting about its front swivel bearing, rises into its flush position with the vehicle roof 1. This position is reached when the position of the parts shown in FIG. 8 is obtained.

Reference is now made to FIGS. 10 to 25 for describing the use of the invention in the case of a sliding lifting roof. To the extent that the components of this roof construction coincide with those of the sliding roof, the same reference numerals are used throughout. As the construction for the sliding lifting roof in connection with the roof frame 9, guide rail 30' and water channel 21 does not differ or only insignificantly differs compared with the corresponding sliding roof construction, to this extent reference is made to the explanations already given. The concealing position of the guide rail 30' also requires special measures for guiding and driving the cover 3' and the presently provided intermediate frame 64 in connection with a sliding lifting roof and these will be described hereinafter.

Figure 17:
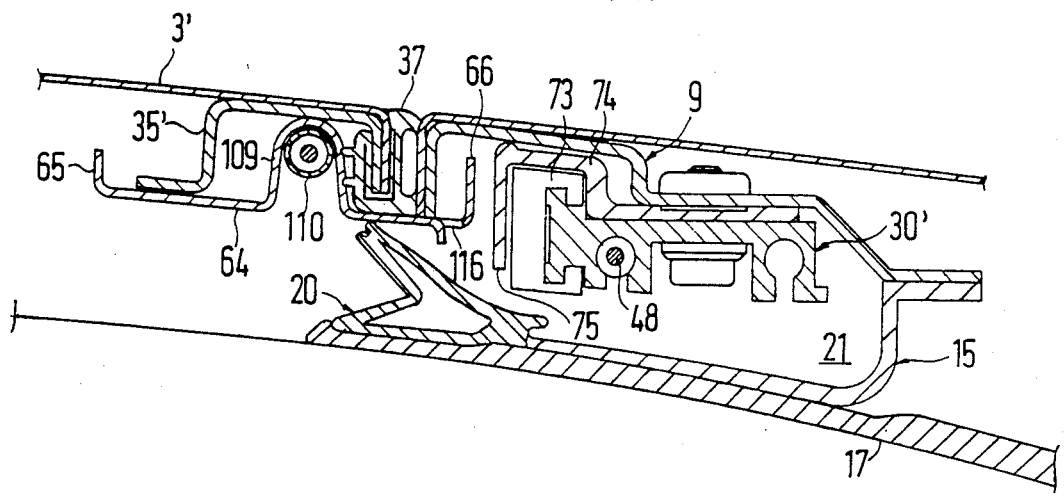
FIG. 17 is a cross-section along line XVII—XVII in FIG. 16.
Figure 18:
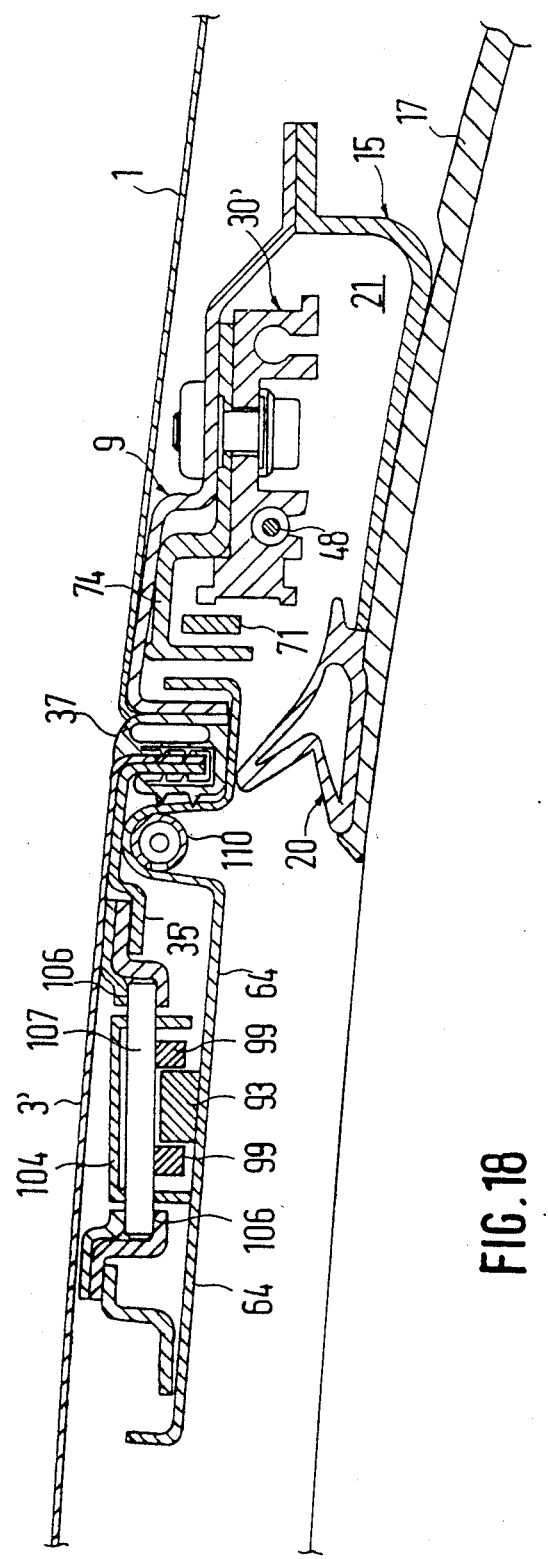
FIG. 18 is a cross-section along the bent line XVIII—XVIII in FIG. 16.
Figure 19:
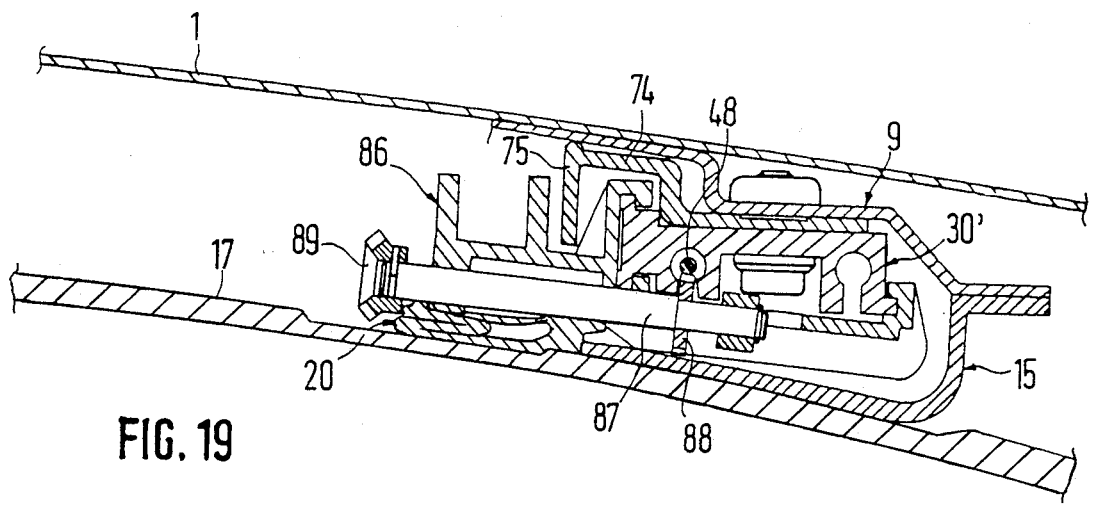
FIG. 19 is a cross-section along line XIX—XIX in FIG. 11.
Figure 20:
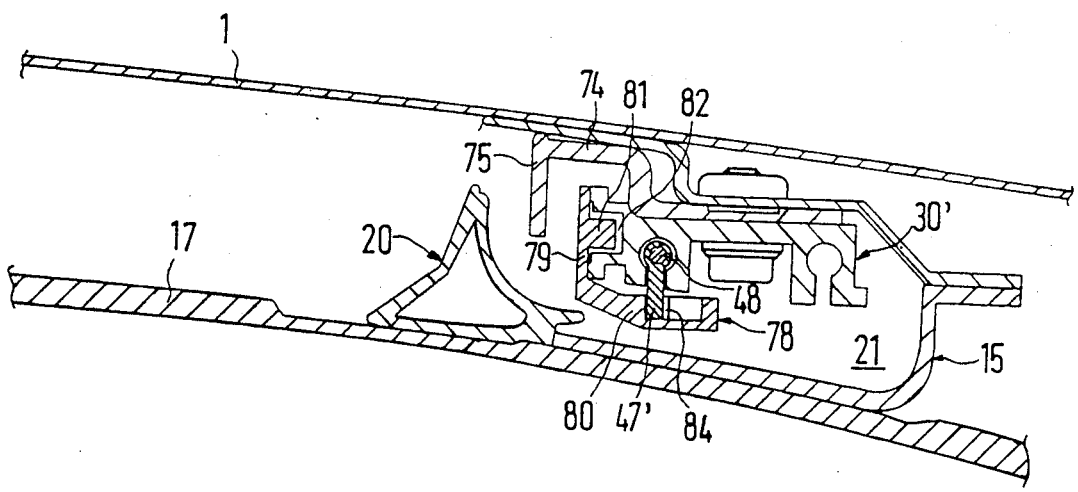
FIG. 20 is a cross-section along line XX—XX in FIG. 16.

The intermediate frame 64 which, both on its inner circumference and on its outer circumference, is provided with an upward bend 65 or 66, is passed by its two lateral edges through the elastically expandable gap 29' (FIG. 22) and therefore engages below the lateral regions of the roof cutout edge 2 in the conventional manner for such intermediate frames. The ledge 28 of the hollow chamber profile 20 engages on the underside of the intermediate frame 64, as can e.g. be gathered from FIGS. 17 and 18. FIGS. 17 and 18 also illustrate that the hollow profile 20 is elastically deformed compared with its inoperative position shown in FIGS. 20 and 22 when the cover 3' is in the closed position. The maximum elastic deformation is achieved in the lowered position of the cover 3', as shown in FIG. 23.

A front guide journal 67 and a rear guide journal 68, which can be seen in FIGS. 11, 14, 15 and 21, is provided on each lateral edge of the intermediate frame 64. These guide journals 67, 68 constantly engage in rearwardly rising link slots 69, 70, located at the front and rear on a through guide ledge 71. The latter is provided on its side remote from the link slots 69, 70 with a front guide shoe 72 and a rear guide shoe 73, which are located in the vicinity of the link slots and are displaceably guided on the guide rail 30'. As the guide shoes 72, 73 are fixed components of the guide ledge 71, the guide shoes are always moved together with the guide ledge and link slots 69, 70.

As can be gathered e.g. from FIG. 22, a profile ledge 74 is fixed to the roof frame 9 and for this purpose is secured between the roof frame 9 and guide rail 30'. On the profile ledge 74 is provided a vertically downwardly directed flange 75 extending over the length of the ledge and in which is provided a front guide slot 76 and a rear guide slot 77, which are in each case open to the bottom, as can be seen from FIGS. 14 and 15. The guide journals 67, 68 are vertically displaceably guided in the guide slots 76, 77. It can be seen that the described arrangement of the guide journals 67, 68, link slots 69, 70 and guide slots 76, 77 force a vertical lifting movement of the intermediate frame 64, if the guide ledge 71 is moved on the guide rail 30'. A corresponding vertical lifting movement is consequently also performed by the closed cover 3' locked in the manner to be described hereinafter to the intermediate frame 64. FIG. 14 shows the position of the parts assumed when the sliding lifting roof is closed. If the guide ledge 71 is moved to the right, then the link slots 69, 70 bring about a simultaneous downward displacement of the guide journals 67, 68. The fixed guide slots 76, 77 ensure that the guide journals 67, 68 are moved vertically downwards. The guide journals take with them the intermediate frame 64 and the cover 3' fixed thereto until the position of the parts shown in FIG. 15 is reached. The guide journals 67, 68 have passed out of the guide slots 76, 77 at the end of the downward lifting movement brought about by the link slots 69, 70, so that the fixed profile ledge 74 can no longer prevent a displacement to the right of the guide journals 67, 68 in the case of a continued movement to the right of the guide ledge 71. This displacement of guide journals 67, 68 corresponds to an opening movement of the intermediate frame 64 and cover 3'. In the reversed movement direction corresponding to the closing direction of the intermediate frame and the cover, the front guide journal 67 abuts against the downwardly extended, front wall surface of the front guide slot 76, so that the closing movement of the intermediate frame and cover is ended. In the case of a continued movement of the guide ledge 71 to the left, the link slots 69 and 70 bring about a vertical upward movement of the guide journals 67, 68 within the guide slots 76, 77 until the closed position shown in FIG. 14 is again reached.

The displacement of the guide ledge 71 takes place through drive cable 48 and the driver 47' fixed thereto (FIGS. 11, 16 and 20) and which for this purpose cooperates with a blocking mechanism 78. As will be described in greater detail hereinafter, the blocking mechanism 78, which in the blocked position prevents the guide ledge 71 from moving on the guide rail 30', is unblocked for vertical and sliding movements of the intermediate frame 64 and cover 3 connected thereto, but is blocked for swinging in and out movements of the rigid cover 3' with respect to the intermediate frame 64.

The blocking mechanism 78 has a leaf spring 79 pretensioned against guide rail 30' and which is rigidly connected at one end to the guide ledge 71 and which carries at its other end a blocking casing 80 (FIGS. 16 and 20), in which engages the drive 47'. In the vicinity of the blocking casing 80, the leaf spring 79 is provided with a blocking pin 81, with which is associated a corresponding blocking opening 82 (FIG. 20) in the guide rail 30'. The blocking casing 80 contains a sloping surface 83 (FIG. 16), which is struck by the drive 47' when the drive cable 48 (FIG. 16) is moved to the right. As a result the leaf spring 79 is bent clockwise as viewed in FIG. 16 by the blocking casing 80 fitted thereto and the blocking pin 81 is drawn out of the blocking opening 82. A further movement to the right of the drive cable 48 means that the driver 47' takes with it the blocking mechanism 78 and all parts connected thereto in the rightward direction towards the opening displacement of the intermediate frame and cover. The blocking pin 81 slides on the surface of the guide rail 30' which faces it and for reducing friction can be provided with a roller, like the end 54 of the locking lever 53 of the embodiment described with reference to FIGS. 1 to 9. However, if in the closed position of the intermediate frame 64, i.e. when the blocking pin 81 is engaged in the blocking opening 82, the cover 3' is to be moved out of its closed position upwards into its open position, then the drive cable 48 is moved to the left in FIG. 16 and the driver 47 passes through an opening 84 (FIG. 20) out of the blocking casing 80.

Further details will now be given of the assemblies of the sliding lifting roof construction associated with the opening and swinging-in movement of the cover 3'.

On the guide rail 30' is displaceably guided a slide 86 connected by means of a guide rod 85 to the rear end of the intermediate frame 64. As a result of the arrangement of the guide rod 84, the slide 86 participates in the sliding movements of the intermediate frame 64. As can best be gathered from FIGS. 16 and 19, a driving shaft 87 at right angles to the sliding direction is mounted on the slide 86. To one side of the driving shaft 87 is fitted a pinion 88, which is connected in non-rotary manner therewith and which is in constant engagement with the thread of the driving cable 48. On the other side of the driving shaft 87 is provided a bevel gear 89 connected in non-rotary manner to the shaft and is in constant engagement with a further, second bevel gear 90 mounted in rotary manner on the slide 86 and whose axis is orientated approximately parallel to the guide rail 30'. The second bevel gear 90 of the mitre gear is connected in non-rotary manner to a flexible shaft 91, which is in driving connection with a lifting mechanism 92 acting between the intermediate frame 64 and cover 3', as will be described hereinafter.

During the sliding movements of the intermediate frame 64, which is obviously always accompanied by the cover 3' resting closed on the intermediate frame, the drive cable 48 and slide 86 move at the same speed, so that the pinion 88 is in inoperative engagement with the threaded cable 48. Thus, in the case of sliding movements, the flexible shaft 91 and the lifting mechanism 92 in drive connection therewith are not driven. However, if the sliding lifting roof is closed, i.e. the cover 3' is raised by the intermediate frame 64 and is located within the roof cutout, as is e.g. shown in FIGS. 12, 17 and 18, no sliding movements can take place as a result of the action of the blocking mechanism 78. Thus, if the drive cable 48 is moved to the left (FIG. 16) in the closed position, it rotates the pinion 88, so that by means of the described gear components the lifting mechanism 92 is driven upwards for opening the cover 3' over the fixed vehicle roof 1. The drive cable 48 moves to the right (FIG. 16) on swinging in the cover 3' again, so that the pinion 88 and therefore the lifting mechanism 92 are driven in the opposite direction until the closed position is reached, where the driver 47' is again located within the blocking casing 80 of the blocking mechanism 78.

Reference will now be made to FIGS. 12, 13, 16 and 25 to further illustrate the construction and function of the lifting mechanism 92. The flexible shaft 91 is non-positively connected to a threaded spindle 94 mounted in rotary manner in a casing 93 of the lifting mechanism and on which is located a rising, i.e. not concomitantly rotated threaded nut 95. To the latter are fixed in equiaxially facing manner two guide journals 96, 97, which engage in linear guide slots 98 (FIG. 25) of the casing 93 running parallel to the threaded spindle 94. Two coinciding guide levers 99 are pivotably mounted on the guide journals 96, 97 and to each of these are fixed in homologous arrangement an inwardly directed guide pin 100 and an outwardly directed link pin 101, which is displaced with respect to the latter. Guide pins 101 engage in control slots 102 arranged in fixed manner in the casing 93, whilst the link pins 101 engage in link slots 103 located laterally in a flap-like opening lever 104. The latter is articulated by means of a swivel bearing 105 about a horizontal axis to the casing 93 of the lifting mechanism 92 fixed in the rear region of the intermediate frame 64.

Figure 16:
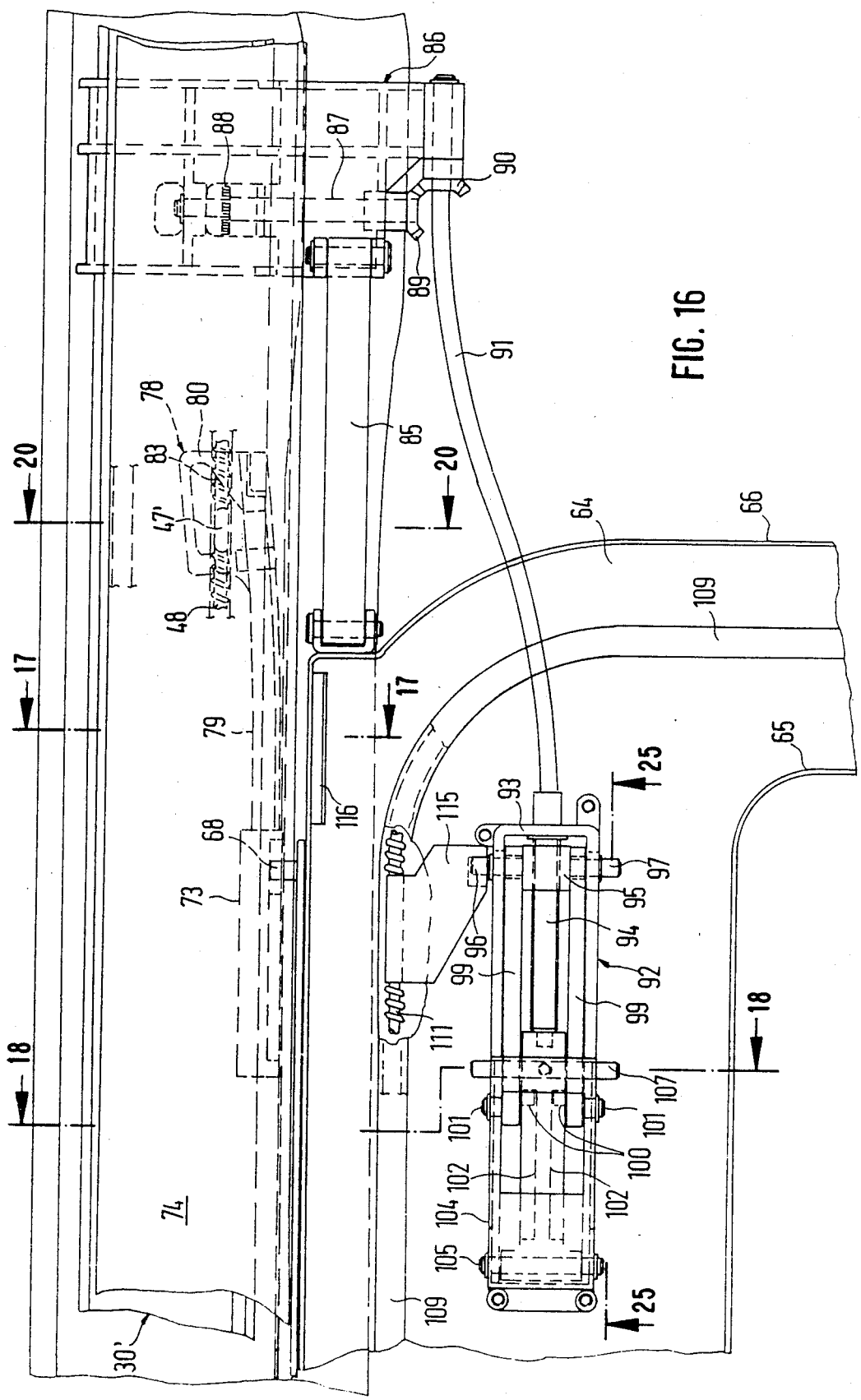
FIG. 16 is a larger scale detail of FIG. 11 in a broken away and in part broken open plan view.

It is clear that in the case of a leftward displacement of the threaded nut 95 starting from the position of FIG. 16, the guide levers 99 are also moved to the left, their pivoting about the guide journals 96, 97 being controlled by the engagement of the guide pins 100 in the guide slots 102. There is a corresponding displacement of the link pins 101 in the link slots 103, so that as a function of the rotation direction of the threaded spindle 94, the opening lever 104 is swung out or in. FIG. 13 shows the maximum swinging out position, whilst FIG. 12 shows the maximum swinging in position, which corresponds to the position of the parts shown in FIG. 16.

As shown in FIG. 13, a guide slot 106 is fitted to the cover 3', in which slot a guide pin 107 fixed to the opening lever 104 engages. This connection of the opening lever 104 to the cover 3' ensures the pivoting movements of the cover about the front cover hinge, which in the represented embodiment is constructed as a bending hinge 108. The latter is on the one hand fixed to the cover reinforcing frame 35' and on the other to the intermediate frame 64.

Figure 11:
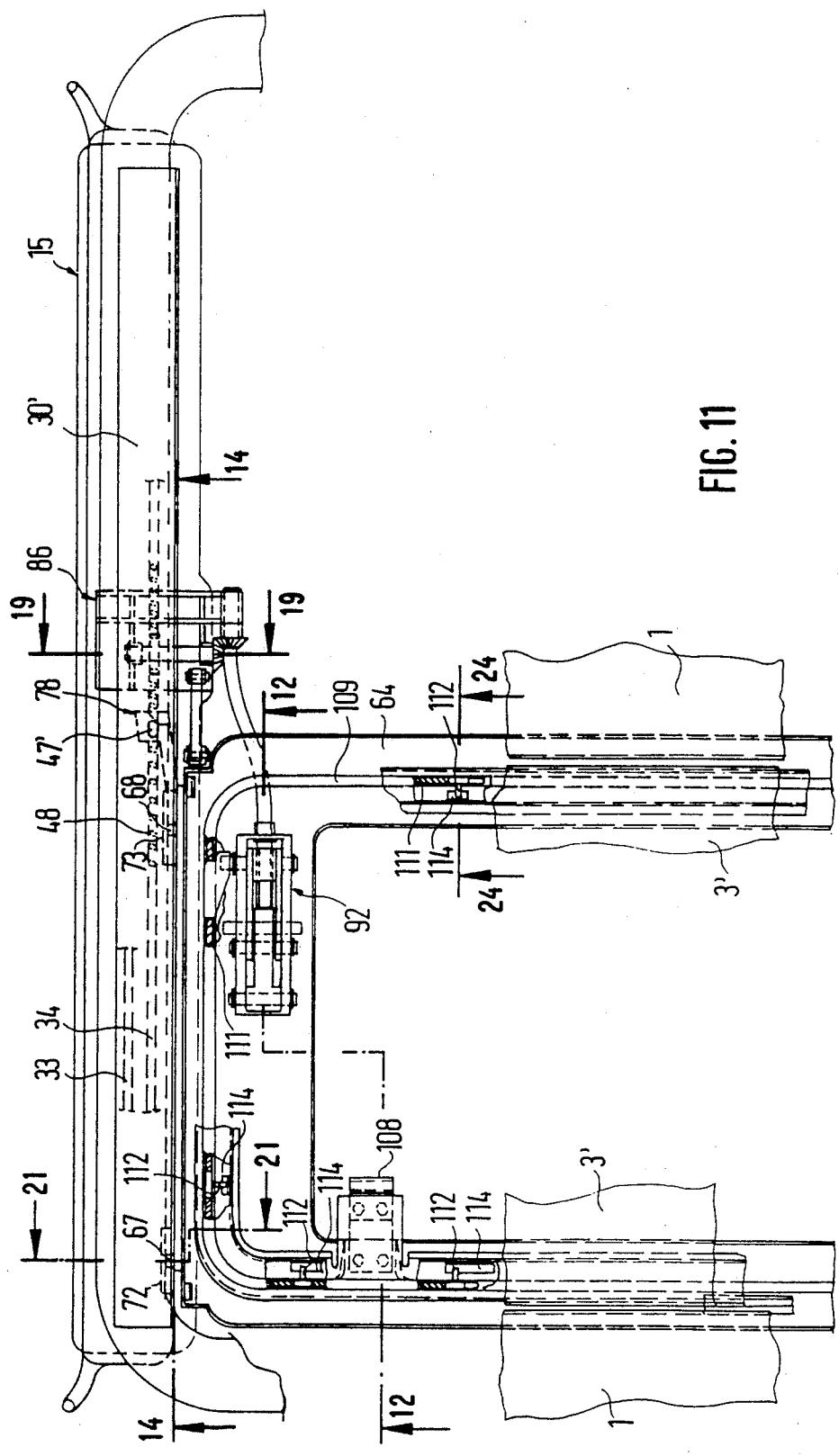
FIG. 11 is a broken away plan view of part of the sliding lifting roof shown in FIG. 10.

In addition to the connection of the cover 3' to the intermediate frame 64 by means of several bending hinges 108 and two lifting mechanisms 92, the intermediate frame is also connected to the cover by a locking device, which is controlled by the displacement of the nut 95 of the lifting mechanism 92. Control takes place in such a way that the locking effect is removed prior to the start of the opening movement of the cover 3' and restored at the end of the swinging movement of said cover. Reference will now be made to FIGS. 11, 16 and 24 to further illustrate the locking device.

As is readily apparent, a pleat-like indentation 109 passing round the intermediate frame 64 contains a split tube 110 fixed to the latter and in which is displaceably guided in compressively rigid manner a flexible cable 111. Several bolts 112 projecting from the split tube 110 are fixed in circumferentially distributed manner to the cable 111 and pass through openings 113 made in the indentation 109. A corresponding number of locking elements 114 are fixed to the cover reinforcing frame 35' and engage in the locking position with the bolts 112, as can be seen in FIG. 11. It is also apparent from the latter that through the displacement of the cable 111 in its split tube 110, the locking action is removed or can be brought about again, as a function of the sliding direction. As is also apparent from FIG. 11, the locking elements 114 are longer on the leading edge of the cover 3', so that in this area it is not possible to eliminate the locking action in the case of movements of the cable 111, which is also not necessary due to the adjacent position of the bending hinge 108. The cable 111 is coupled to the threaded nut 95 of the lifting mechanism 92 by means of a driver 115 (FIG. 16) engaging on the guide journal 96 and which is fixed to the cable 111. The described locking device ensures that also in the case of very high lifting forces the cover 3' cannot lift from the intermediate frame 64 fixedly anchored in the roof cutout. In addition, the locking device means that any attempt to break into the car through the sliding lifting roof will be unsuccessful.

Figure 26:
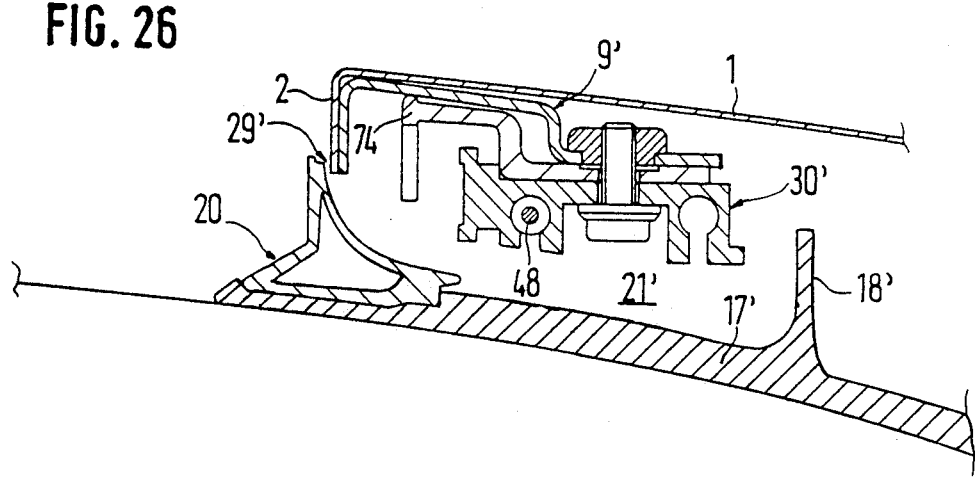
FIG. 26 is a cross-section similar to FIG. 22 through a variant.

In the case of the modification shown in FIG. 26, the water channel 21' forms part of the roof top 17' constructed as a fixed mould shell. In this case there is also no connection between the upper bend 18' and the roof frame 9'. The hollow chamber profile 20 is fixed in a depression of the roof top 17'. Obviously in all embodiments of the sliding lifting roof with intermediate frame, it is ensured that water introduced through the marginal gap 4 and received by the intermediate frame 64 is passed into the water channel 21 or 21'. This takes place by means of several openings 116 (FIGS. 16 and 17) made on the sides of intermediate frame 64.

Diverging from the represented embodiment, the hollow chamber profile 20 must merely underpin the lateral openings 116 for receiving the water and therefore, contrary to what is shown, does not project over the roof cutout edge 2 into the roof cutout.

We claim:

1. A sliding roof or sliding lifting roof for a motor vehicle, with a rigid cover and also provided with an intermediate frame in the case of the sliding lifting roof, the rigid cover being displaceably guided on lateral guide rails, optionally together with the intermediate frame, which guide rails are fixed to a roof frame, which surrounds a roof cutout of the fixed vehicle roof, and the rigid cover being driven by a drive cable guided in the guide rails and engaging on guide parts connected thereto; the guide rails are arranged entirely below the fixed vehicle roof and are fixed to the roof frame, which is closely adjacent to the fixed vehicle roof and fitted thereto, being set back with respect to the roof cutout edge; a water channel is provided below the guide rails and at a limited distance therefrom, the water channel being elastically deformable from above at least on its edge adjacent to the roof cutout edge and the guide parts connecting the cover and optionally the intermediate frame to the guide rails passing through the elastically expandable gap between the roof cutout edge and the elastically deformable water channel edge.

2. A sliding roof or sliding lifting roof according to claim 1, wherein the roof frame has a cross-sectionally horizontal mounting plate, to which the guide rail is fixed from below.

3. A sliding roof or sliding lifting roof according to claim 1, wherein the guide rail has cable ducts which are open at the bottom and the guide paths for the guide parts displaceable on the guide rail are arranged at least on one side of the latter.

4. A sliding roof or sliding lifting roof according to claim 1, wherein the elastically deformable edge of the water channel is constructed as an elastic hollow chamber profile.

5. A sliding roof or sliding lifting roof according to claim 4, wherein the hollow profile has an approximate triangular cross-sectional configuration, with a base part, a side wall bent inwards towards its cavity and a water channel wall forming therewith an upwardly directed ledge.

6. A sliding roof or sliding lifting roof according to claim 1, wherein the water channel is formed by a profile strip, which considered in cross-section has a lower wall part rising towards the roof cutout and to whose end facing said cutout is connected the elastically deformable edge of the water channel and whose other end is shaped into an upward bend.

7. A sliding roof or sliding lifting roof according to claim 6, wherein the upward bend is connected to the roof frame.

8. A sliding roof or sliding lifting roof according to claim 1, wherein the water channel is shaped into the roof top constructed as a rigid, moulded shell.

9. A sliding roof or sliding lifting roof according to claim 1, wherein the water channel is formed with its elastically deformable edge from a one-part profile strip which, starting from its elastically deformable edge, has an outwardly increasing material reinforcement as viewed in cross-section.

10. A sliding roof or sliding lifting roof according to claim 1, wherein the water channel projects over the roof cutout edge with its elastically deformable edge at the most up to the underpinning of the marginal gap between the cover and roof cutout edge.

11. A sliding roof according to claim 1, wherein to either side of the cover are fixed two spaced guide fingers projecting over its outer edge and which are passed through the elastically expandable gap, the front guide finger carrying a horizontally directed swivel bearing pin, which engages in a corresponding bearing bore in a front guide shoe displaceably guided on the guide rail and the rear guide finger engages on the rear end of a link articulated by its front end to the front guide shoe and having a link slot in which engages a guide pin fixed to a rear guide shoe, which is connected by means of a driver to the drive cable.

12. A sliding roof according to claim 11, wherein a third guide shoe is displaceably guided on the guide rail, which is connected by means of a guide rod to the rear end of the link and carries a projection mounting a two-armed locking lever engaging below the guide rail, on which the locking lever is pivotable about a substantially upright bearing bolt, engages with one end in the cover closing position under spring loading in a recess in a downwardly directed flange of the guide rail and on its other end carries a coupling hook, which for sliding transport of the cover engages in a corresponding coupling recess, which is located on an unlocking and transport member fixed to the rear sliding shoe and which co-operates with an unlocking finger for unlocking the locking lever from the recess at the end of the lowering movement of the cover.

13. A sliding roof according to claim 1 and comprising a cover reinforcing frame fitted to the underside of the cover, such that, when the cover is closed, the elastically deformable edge of the water channel engages on this frame.

14. A sliding lifting roof according to claim 1, wherein the intermediate frame with its two lateral edges is guided through the elastically expandable gap and on each lateral edge is provided with a front and a rear guide journal, which engage in identically directed, rearwardly rising link slots of a guide ledge, which is displaceably guided with a front and a rear guide shoe on the associated guide rail; the guide journals during the vertical movement of the intermediate frame brought about by the link slots during the displacement of the guide ledge are guided in upright guide slots provided on the fixed vehicle roof; the drive cable is connected to the guide ledge by means of a blocking mechanism operable by a driver fixed to said cable for sliding movements of the intermediate frame, the blocking mechanism being unblocked for vertical and sliding movements of the intermediate frame and blocked for swinging in and out movements of the rigid cover; a slide is displaceably guided on the guide rail connected by means of a guide rod to the rear end of the intermediate frame and which mounts a driving shaft arranged at right angles to the sliding direction, said shaft being engaged on the one hand constantly to a thread system of the drive cable by means of a pinion fitted thereto and on the other hand carries a first mitre gear component, which is in constant engagement with an associated second mitre gear component mounted in rotary manner on the slide and whose axis is orientated substantially parallel to the guide rail and which is connected in non-rotary manner to a flexible shaft, which non-positively engages on a threaded spindle mounted in rotary manner on the intermediate frame and on which is located a rising threaded nut, which engages on a lifting mechanism connected on the one hand to the rear end of the intermediate frame and on the other hand to the rear end of the cover hinged at the front to the intermediate frame.

15. A sliding lifting roof according to claim 14, wherein the blocking mechanism has a leaf spring pretensioned against the guide rail and whereof one end is fixed to the guide ledge and carries on its other end a blocking casing, in which engages the driver and is provided in the vicinity of the blocking casing with a blocking pin, with which is associated a corresponding blocking opening in the guide rail, an inclined surface in the blocking casing being associated with the driver for unblocking purposes and the blocking casing has an outlet for the driver for discontinuing its engagement with the blocking casing during swinging in and out movements of the rigid cover.

16. A sliding lifting roof according to claim 14, wherein the lifting mechanism comprises an opening lever controlled by link slots and link pins articulated on the one hand by means of a swivel bearing to the intermediate frame and on the other hand by means of a guide slot to the cover.

17. A sliding lifting roof according to claim 14, wherein the intermediate frame is additionally connected to the rigid cover by a locking device, which is unlockable prior to the start of the opening movement of cover controlled by the movement of the threaded nut of the lifting mechanism and is lockable at the end of the swinging in movement.

18. A sliding lifting roof according to claim 17, wherein the locking device has a flexible cable displaceably guided in compressively rigid manner at least laterally and rearwardly on intermediate frame in a split tube fixed to the latter, whereby a plurality of bolts are fixed to said cable which project out of the split tube and which engage in the locking position with locking elements fixed to the cover and that a drive fitted to the threaded nut of the lifting mechanism engages in the split tube and is fixed to the cable.

* * * * *